United States Patent
Spitzer et al.

(10) Patent No.: US 9,280,005 B2
(45) Date of Patent: *Mar. 8, 2016

(54) PHOTO-CHROMIC COATING FOR OPTICS

(71) Applicant: Google Inc., Mountain View, CA (US)

(72) Inventors: Mark B. Spitzer, Sharon, MA (US); Anurag Gupta, San Jose, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/243,799

(22) Filed: Apr. 2, 2014

(65) Prior Publication Data

US 2014/0211290 A1    Jul. 31, 2014

Related U.S. Application Data

(63) Continuation of application No. 13/631,034, filed on Sep. 28, 2012, now Pat. No. 8,724,206.

(51) Int. Cl.
| | |
|---|---|
| *G02F 1/03* | (2006.01) |
| *G02B 5/30* | (2006.01) |
| *G02B 5/23* | (2006.01) |
| *G02B 27/01* | (2006.01) |

(52) U.S. Cl.
CPC .. G02F 1/03 (2013.01); G02B 5/30 (2013.01); G02B 27/0101 (2013.01); G02B 27/0172 (2013.01); *G02B 5/23* (2013.01); *G02B 2027/0118* (2013.01); *Y10T 29/49885* (2015.01)

(58) Field of Classification Search
CPC ................................... G02B 5/30; G02B 5/23
USPC ........... 359/241, 240, 630, 633, 634; 345/7, 8
See application file for complete search history.

(56) References Cited

U.S. PATENT DOCUMENTS

| | | |
|---|---|---|
| 5,246,728 A | 9/1993 | Rodriquez |
| 5,770,259 A | 6/1998 | Parker et al. |
| 6,384,982 B1 | 5/2002 | Spitzer |
| 7,978,391 B2 | 7/2011 | Kumar et al. |
| 8,467,133 B2 | 6/2013 | Miller |

(Continued)

FOREIGN PATENT DOCUMENTS

| | | |
|---|---|---|
| TW | 201219829 A | 5/2012 |
| WO | WO 00/12304 A1 | 3/2000 |

OTHER PUBLICATIONS

PCT/US2013/052093; International Search Report and Written Opinion, mailed Nov. 26, 2013, (14 pages).

(Continued)

*Primary Examiner* — Tuyen Tra
(74) *Attorney, Agent, or Firm* — Blakely Sokoloff Taylor & Zafman LLP

(57) ABSTRACT

An eyepiece includes a viewing region to emit display light out of the eyepiece along an eye-ward direction, an input end peripherally located from the viewing region and configured to receive the display light into the eyepiece, one or more optical elements positioned to direct the display light received into the eyepiece out of the viewing region along the eye-ward direction, a first side through which ambient scene light is received into the eyepiece, a second side out of which the ambient scene light and the display light are passed along the eye-ward direction, and a photo-chromic coating disposed on the first side and the second side, the photo-chromic coating to darken in the presence of UV light.

24 Claims, 5 Drawing Sheets

(56) References Cited

U.S. PATENT DOCUMENTS

| | | |
|---|---|---|
| 8,724,206 B2 | 5/2014 | Spitzer et al. |
| 2007/0034322 A1 | 2/2007 | Glacet et al. |
| 2007/0035694 A1 | 2/2007 | Keller |
| 2010/0096602 A1 | 4/2010 | Mosse et al. |
| 2012/0069448 A1 | 3/2012 | Sugihara et al. |
| 2012/0119978 A1 | 5/2012 | Border et al. |
| 2012/0206485 A1 | 8/2012 | Osterhout et al. |
| 2012/0235900 A1 | 9/2012 | Border et al. |

OTHER PUBLICATIONS

U.S. Notice of Allowance mailed Jan. 7, 2014, U.S. Appl. No. 13/631,034, filed Sep. 28, 2012, (15 pages).

TW102135194—Taiwan Office Action and Search Report with English translation mailed Nov. 17, 2014, 10 pages.

PCT/US2013/052093; PCT International Preliminary Report on Patentability, mailed Apr. 9, 2015 (11 pages).

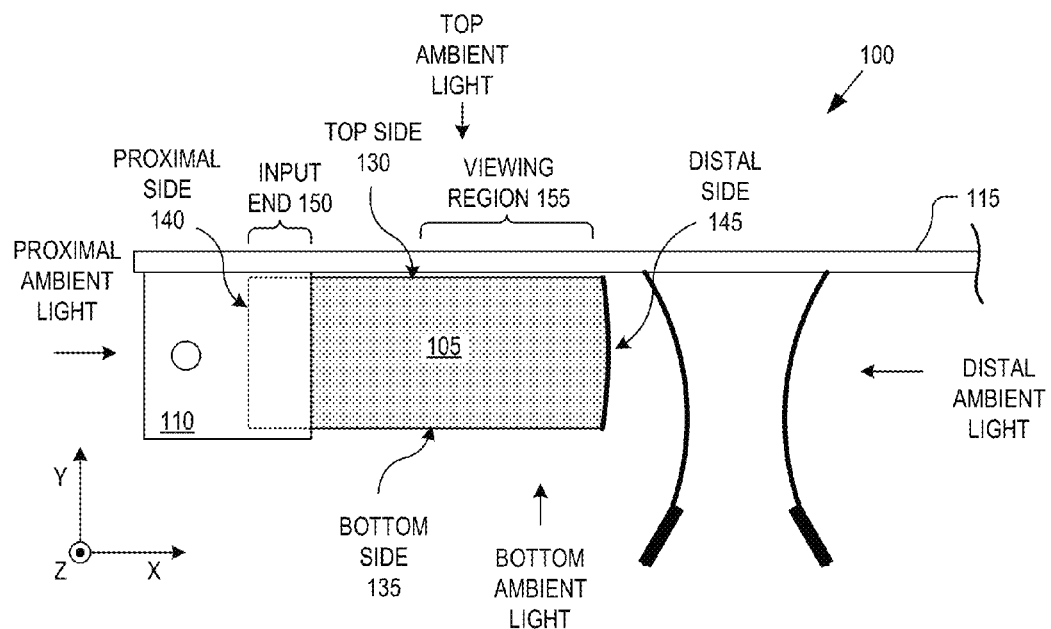
FIG. 2A
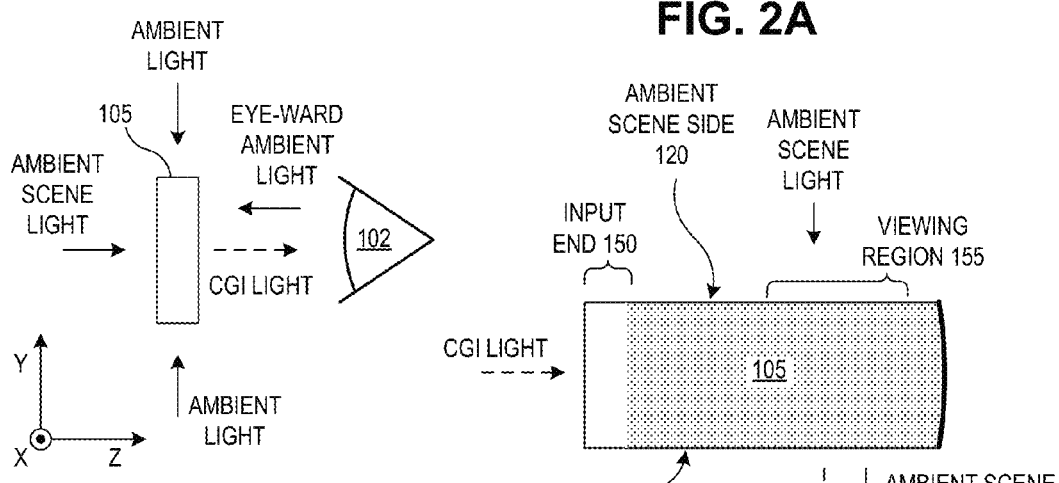
FIG. 2B
FIG. 2C

PHOTO-CHROMIC COATING FOR OPTICS

CROSS-REFERENCE TO RELATED APPLICATION

The present patent application is a continuation of U.S. application Ser. No. 13/631,034, filed on Sep. 28, 2012.

TECHNICAL FIELD

This disclosure relates generally to the field of optics, and in particular but not exclusively, relates to photo-chromic coatings.

BACKGROUND INFORMATION

Photo-chromic lenses are lenses that darken when exposed to sunlight to reduce the brightness of the ambient sunlight reaching the eyes. Typically, the darkening effect of photo-chromic lenses is triggered by the UV radiation present in sunlight, and the darkening effect attenuates light. Once the UV radiation is removed, the photo-chromic molecules, which increase their absorption during exposure to UV light, transition back to a substantially transparent or non-darkened state. Artificial indoor light does not ordinarily include UV radiation. As such, photo-chromic lenses will reversibly darken when outdoors, and return to their non-darkened state when indoors.

Prescription eyeglasses are available with photo-chromic lens darkening. For glass lenses, the photo-chromic molecules (e.g., silver halides such as silver chloride) are often embedded throughout the volume of the lens substrate (not coated), while plastic lenses typically use a layer of organic photo-chromic molecule (e.g., oxazines) that is coated on a single surface of the plastic lens to achieve reversible darkening. Conventionally, the photo-chromic coating is spin coated on the single forward facing side surface (ambient scene side) of the plastic lens.

BRIEF DESCRIPTION OF THE DRAWINGS

Non-limiting and non-exhaustive embodiments of the invention are described with reference to the following figures, wherein like reference numerals refer to like parts throughout the various views unless otherwise specified. The drawings are not necessarily to scale, emphasis instead being placed upon illustrating the principles being described.

FIG. 2A illustrates a portion of the HMD having a photo-chromic coating disposed on multiple sides of an eyepiece of the HMD, in accordance with an embodiment of the disclosure.

FIGS. 2B & 2C illustrate the eyepiece of the HMD from two different angles, in accordance with an embodiment of the disclosure.

DETAILED DESCRIPTION

Embodiments of an apparatus and method of fabrication of an optical component, such as an eyepiece for a head mounted/mountable display ("HMD"), having a photo-chromic coating on multiple sides are described herein. In the following description numerous specific details are set forth to provide a thorough understanding of the embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" in various places throughout this specification are not necessarily all referring to the same embodiment. Furthermore, the particular features, structures, or characteristics may be combined in any suitable manner in one or more embodiments.

Figure 1A:
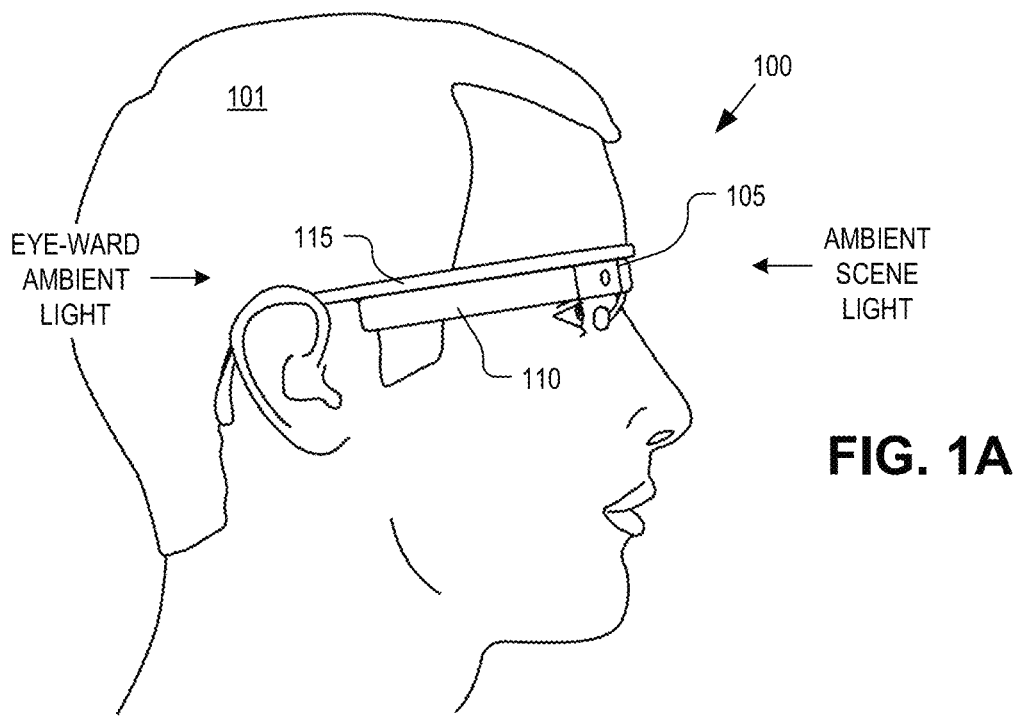
FIGS. 1A & 1B illustrate a head mounted/mountable display ("HMD") having a photo-chromic coating disposed on multiple sides of an eyepiece of the HMD, in accordance with an embodiment of the disclosure.
Figure 1B:
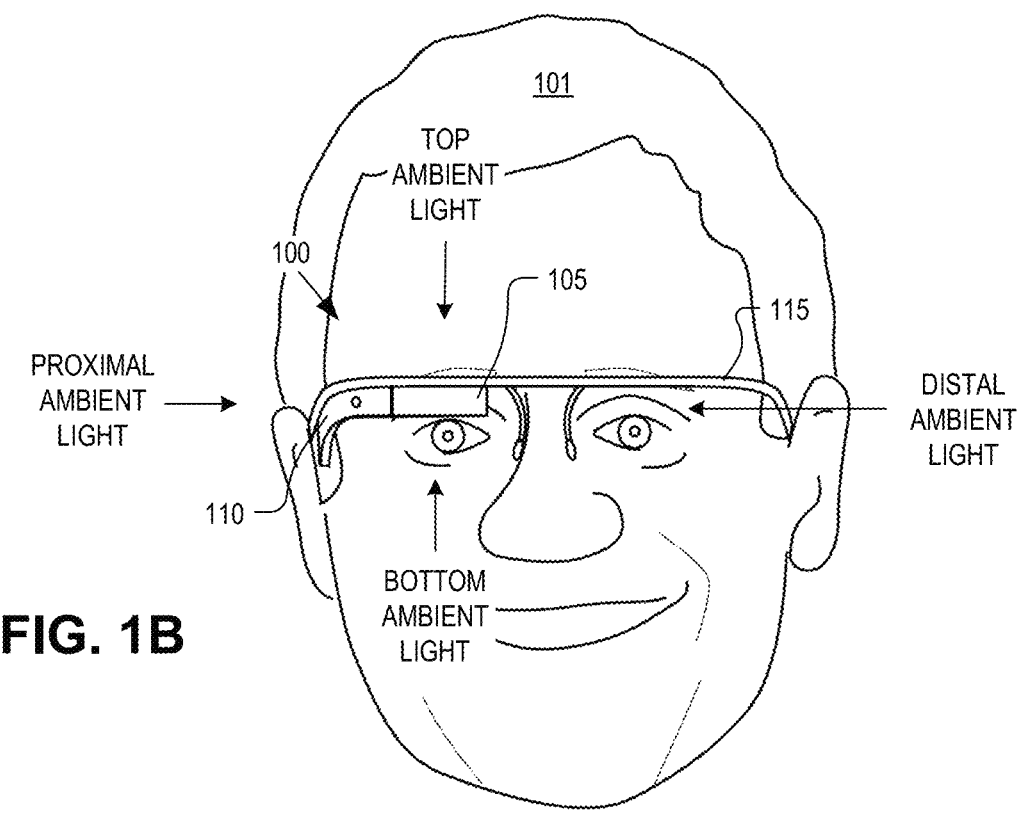

FIGS. 1A & 1B illustrate a head mounted/mountable display ("HMD") 100 having a photo-chromic coating disposed on multiple sides of an eyepiece 105, in accordance with an embodiment of the disclosure. FIG. 2A illustrates an expanded view of a right side portion of HMD 100 while FIG. 2B illustrates a cross-sectional view of eyepiece 105 and FIG. 2C illustrates a top side view of eyepiece 105. The illustrated embodiment of HMD 100 includes eyepiece 105, electronic housing 110, and frame assembly 115. Although HMD 100 is illustrated as a monocular HMD, it should be appreciated that in other embodiments (not illustrated) two eyepieces 105 may be supported by frame 115 in front of the vision of user 101 to form a binocular HMD.

Figure 5:
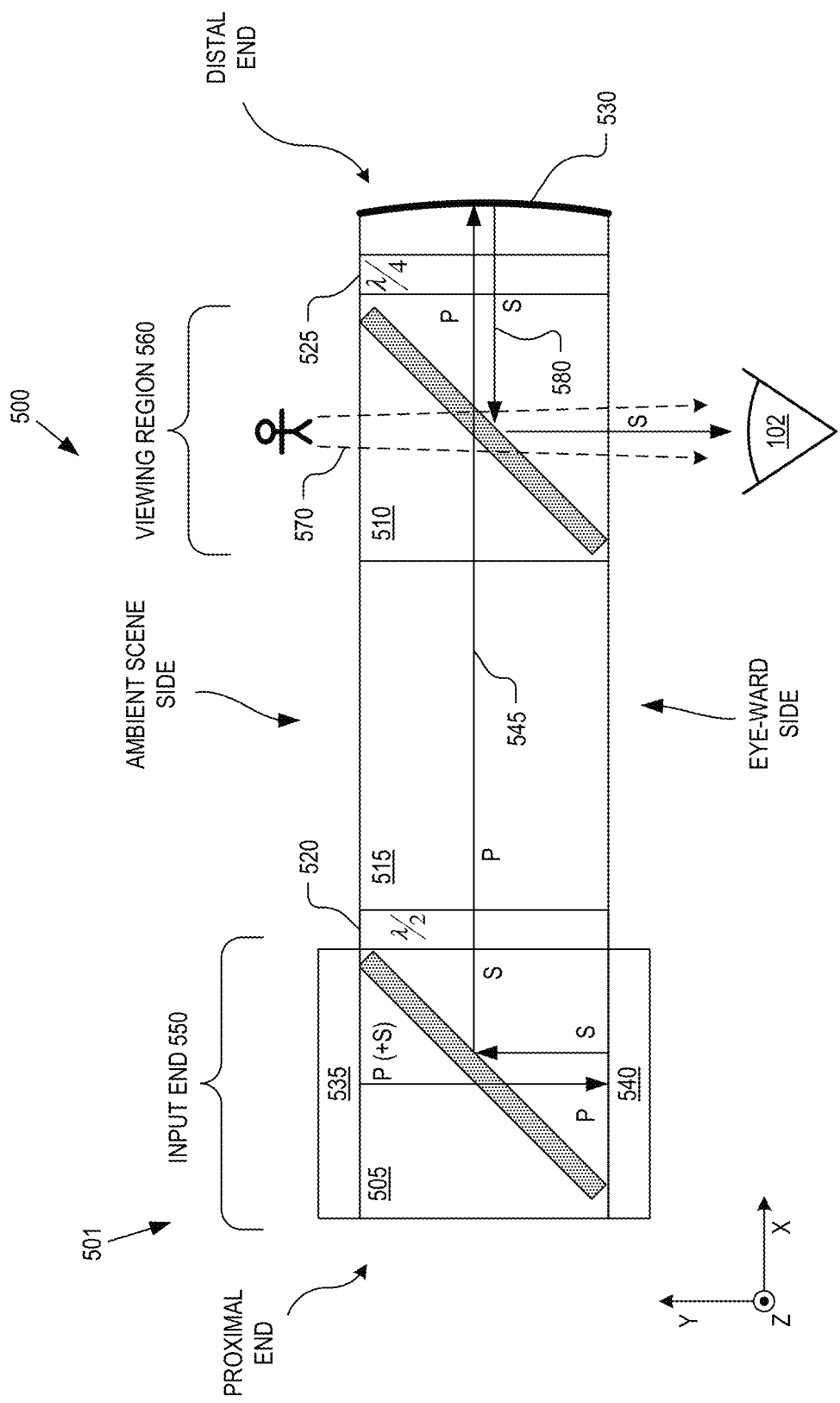
FIG. 5 illustrates demonstrative internal components of an eyepiece along with display circuitry for an HMD, in accordance with an embodiment of the disclosure.

In the illustrated embodiment, eyepiece 105 has a cuboid volumetric shape (e.g., rectangular cuboid) having six sides: ambient scene side 120 (FIG. 2C), eye-ward side 125, top side 130 (FIG. 2A), bottom side 135, a proximal side 140, and a distal side 145. Eyepiece 105 further includes an input end 150 near proximal side 140 and a viewing region 155 near distal side 145. Input end 150 is coupled into electronic housing 110 to receive computer generated image ("CGI") light from a display module disposed therein. By CGI, we mean all images of any type that are either created by a computer, recalled from memory, streamed or otherwise provided electronically to the housing 110, including images that are photographic. Viewing region 155 is the portion of eyepiece 105 through which the CGI may be viewed. Eyepiece 105 may include various types of light bending optics to receive the CGI light into eyepiece 105 at input end 150 and output the CGI light along an eye-ward direction in viewing region 155. FIG. 5 illustrates an example of such internal light bending optics. Although FIGS. 2A-C illustrates only a rectangular cuboid shape for eyepiece 105, other shapes may be implemented including more traditional eyewear shaped eyepieces.

Referring to FIG. 2A, housing 110 is supported by frame 115 and encases various electronics of HMD 100. For example, housing 110 includes a display module for generating the CGI light. In various embodiments, housing 110 may further house one or more of memories storing program instructions, a microprocessor, a camera, a microphone, wireless interface circuitry (e.g., WiFi circuitry, Bluetooth circuitry, cellular circuitry), a rotation sensing system, GPS, etc.

Eyepiece 105 further includes a photo-chromic coating (illustrated with shading in FIGS. 2A and 2C) disposed on multiple surfaces of eyepiece 105 including at least ambient scene side 120 and eye-ward side 125. The photo-chromic coating may be fabricated of a material that darkens in the presence of ultraviolet ("UV") light to attenuate incident UV and visible spectrum light in bright outdoor environments. In some embodiments, the photo-chromic coating also coats top side 130 and bottom side 135 of eyepiece 105. However, in the illustrated embodiment, the photo-chromic coating does not cover input end 105 of eyepiece 105. Input end 105 is at least the portion of eyepiece 105 near proximal side 140 that is surrounded by housing 110 and/or electronics coupled to eyepiece 105 for injecting the CGI light into eyepiece 105. In other embodiments, input end 105 is coated with a photo-chromic layer since very little UV light propagates to this portion of eyepiece 105

During operation, a display module disposed within housing 110 injects CGI light into eyepiece 105 at input end 150, which is peripheral to the user's central vision. Internal light bending optics within eyepiece 105 deliver the CGI light to viewing region 155 and emit the CGI light out eye-ward side 125 along an eye-ward direction into eye 102. In a "see-through" or "augmented reality" HMD, such as HMD 100, viewing region 155 is partially transparent or see-through. Thus, ambient scene light passes through the viewing region 155 to eye 102 and is combined with the CGI light emitted along the eye-ward direction. The CGI light appears to be superimposed over the ambient scene light. Thus ambient light competes with the CGI light. If the ambient light is too bright in comparison to the CGI light, it can appear to wash out the CGI light by decreasing the relative brightness of the CGI with respect to the ambient light, and in this way make the CGI difficult to view by the user. The user would perceive a reduction in brightness and/or contrast of the CGI.

There are six sides to eyepiece 105; four of these sides may allow ambient light to enter eyepiece 105 to compete with the CGI light. Ambient scene side 120 faces the ambient world in front of the user, eye-ward side 125 faces the user's eye 102, top side 130 and bottom side 135 face up and down, respectively, while proximal side 140 and distal side 145 face right and left, respectively. When eyepiece 105 is mounted to housing 110, proximal side 140 is covered and therefore not susceptible to proximal ambient light incident from the right entering into eyepiece 105. In the illustrated embodiment, distal side 145 is also covered with an end reflector and protective material, which together are opaque and block distal ambient light from entering into eyepiece 105 from the user's left side. However, the other four sides still remain as potential sources of ambient light.

The front side (corresponding to ambient scene side 120) of an eyepiece element can be coated with a photo-chromic layer that darkens in the presence of UV light (i.e., sunlight). This layer is used to improve the contrast of CGI light in the presence of high ambient light, such as sunlight. The photo-chromic layer applied to the front side of an eyepiece element solves this problem by darkening in the presence of ultraviolet (UV) light, thus limiting the amount of ambient light penetrating through the eyepiece, and in this way increases the ratio of the display brightness to the ambient brightness.

Conventionally it has been thought that coating eye-ward side 125 with a photo-chromic layer was undesirable and counter-productive, since this eye-ward side coating would also attenuate the CGI image light emitted from the optical eyepiece. If both the CGI light and the ambient scene light are attenuated, then no contrast gain of the CGI light over the ambient scene light is achieved. Attenuating the CGI light at eye-ward side 125 is counter-productive for yet another reason, since it requires a corresponding increase in the brightness of the CGI light, thereby consuming more power than otherwise necessary. In an HMD, battery power is limited and design choices that sacrifice battery power are generally undesirable. For these reasons, conventional HMD systems do not include photo-chromic layers on the inside surface or eye-ward side 125.

However, it has recently been recognized that the amount of UV light reaching the eye-ward side 125 of eyepiece 105 is relatively small compared to the UV light that reaches ambient scene side 125 (front), top side 130, and bottom side 135. As such, eye-ward side 125 will only slightly darken compared to the amount of darkening that will occur on ambient scene side 120 and the top and bottom sides 130 and 135. Accordingly, embodiments of eyepiece 105 are coated with photo-chromic material on ambient scene side 120 and eye-ward side 125, and in some embodiments, also coated on top side 130 and bottom side 135. In yet another embodiment, ambient scene side 120, top side 130, and bottom side 135 may be coated without coating eye-ward side 125. However, by coating eyepiece 105 on all four sides with a photo-chromic UV darkening material, the UV light entering through ambient scene side 120, top side 130, and bottom side 135 is partially absorbed by these photo-chromic coatings before reaching eye-ward side 125, and if the eyepiece 105 is composed of a plastic material, may be yet further absorbed by the plastic material itself, thereby resulting in a substantial reduction of the UV reaching eye-ward side 125. Furthermore, since HMD 100 is typically worn in a manner that places eyepiece 105 relatively close to the face of user 101, the user's face substantially blocks eye-ward ambient light from reaching eye-ward side 125. Therefore the darkening of the photo-chromic layer on eye-ward side 125 is not significant compared to the darkening of the photo-chromic layer on the other three sides, which block the ambient sunlight from entering the optical system.

Thus the eye-ward side darkening effect is inhibited by absorption of ambient UV light by the photo-chromic layers on the ambient side, by absorption in the eyepiece itself, and by the shadowing of ambient UV light by the user's head. Following this logic, proximal side 140 may also be coated with photo-chromic material without significant adverse optical effects. Once the mirror coating (530 in FIG. 5) is applied, distal side 145 may also be coated with photo-chromic material without adverse optical effect because it is opaque to CGI and ambient light. With the realization that all sides may be coated with photo-chromic UV darkening material and still provide an image contrast gain, a cost reduction in manufacturing is achievable.

Once it is realized that all surfaces of eyepiece 105 may be coated with a photo-chromic material, the application of the photo-chromic material can become markedly less expensive. In addition, coating all exposed sides of eyepiece 105 with photo-chromic material has the added benefit of reducing the penetration of UV radiation into eyepiece 105, which protects the bulk material (e.g., plastic) and internal components of eyepiece 105 from degradation during long term exposure to UV radiation. Therefore, this technique offers an improvement in display contrast, while significantly reducing fabrication cost/complexity since dip or spray coating techniques can be used to apply the photo-chromic material to eyepiece 105 and improving the longevity of the optical components. In contrast, eyepieces with single sided photo-chromic layers would use more involved and more costly fabrication techniques such masking, spin-coating, and the like.

Figure 3:
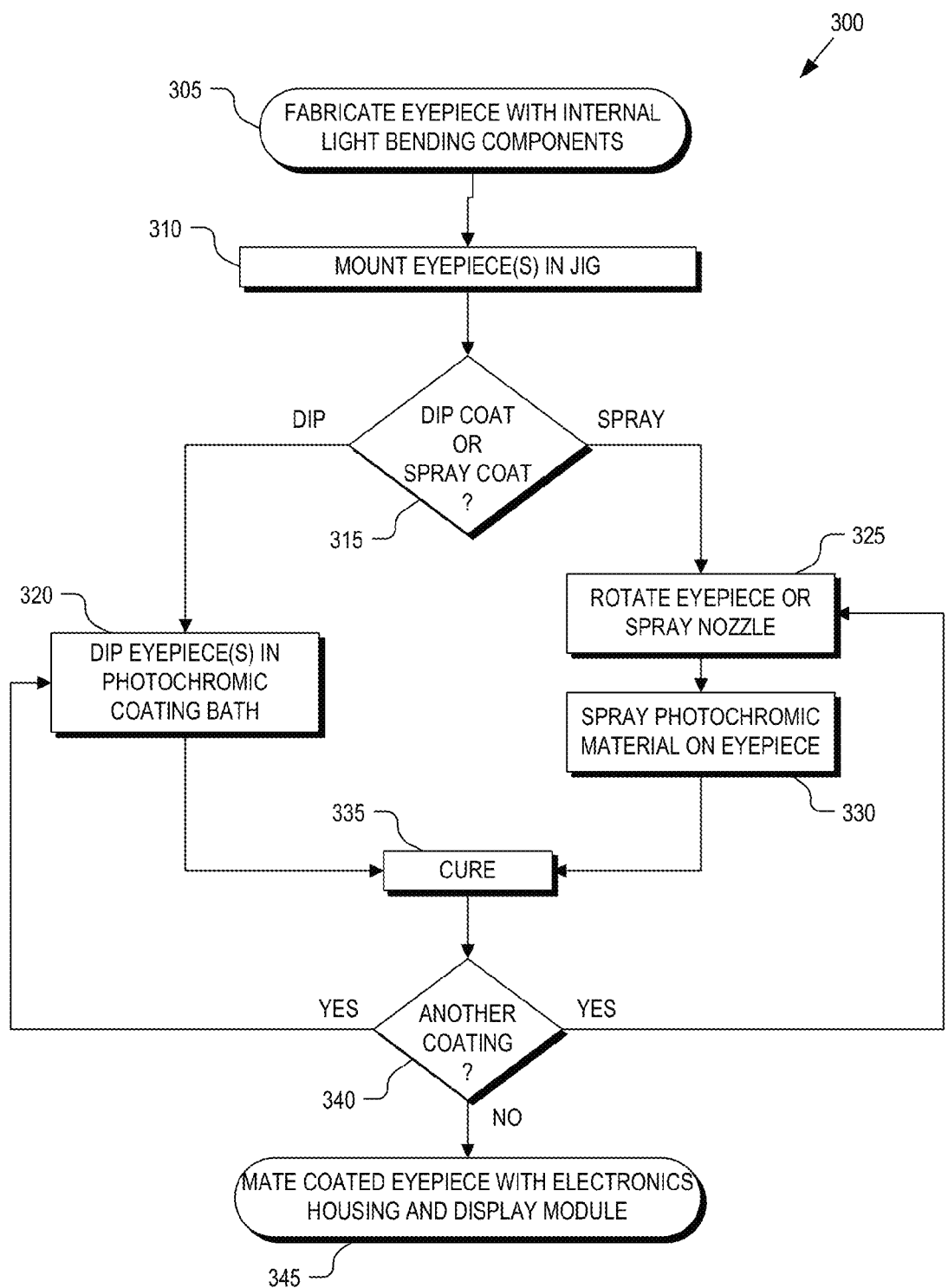
FIG. 3 is a flow chart illustrating a process for fabricating an eyepiece having a photo-chromic coating disposed on multiple sides for use with an HMD, in accordance with an embodiment of the disclosure.

FIG. 3 is a flow chart illustrating a process 300 for fabricating eyepiece 105 having a photo-chromic coating disposed on multiple sides for use with HMD 100, in accordance with an embodiment of the disclosure. Process 300 is described with reference to FIGS. 4A and 4B. The order in which some or all of the process blocks appear in process 300 should not be deemed limiting. Rather, one of ordinary skill in the art having the benefit of the present disclosure will understand that some of the process blocks may be executed in a variety of orders not illustrated, or even in parallel.

In a process block 305, eyepiece 105 is fabricated and assembled including the internal light bending components but without a photo-chromic coating. For example, the internal light bending optics may include an input reflective surface disposed at input end 150, an output reflective surface disposed within viewing region 155, an end reflector disposed at distal side 145, and one or two polarization rotators. The input and output reflective surfaces may be partially reflective beam splitters (e.g., 50/50 beam splitter) or partially reflective polarization beam splitters ("PBS"). FIG. 5 illustrates one example of the internal light bending components that may be assembled together to form eyepiece 105.

Figure 4B:
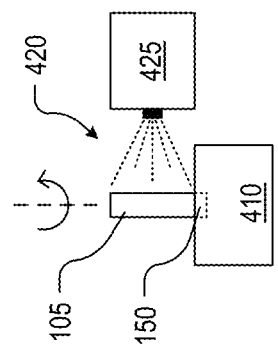
FIG. 4B illustrates a fabrication technique for spray coating a photo-chromic layer onto multiple sides of an eyepiece of an HMD, in accordance with an embodiment of the disclosure.
Figure 4A:
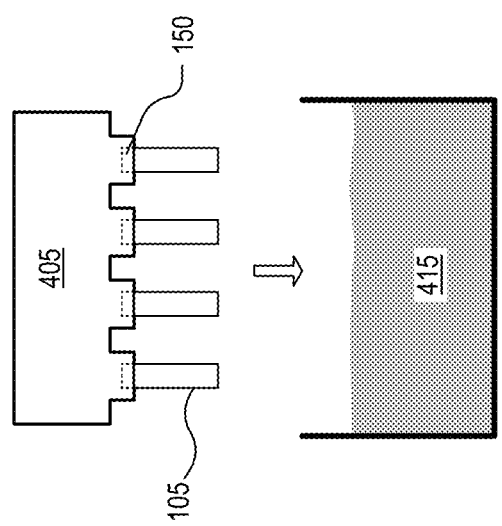
FIG. 4A illustrates a fabrication technique for dip coating a photo-chromic layer onto multiple sides of an eyepiece of an HMD, in accordance with an embodiment of the disclosure.

In a process block 310, the assembled eyepiece 105 is mounted in a jig (e.g., jig 405 or jig 410), as shown in FIGS. 4a and 4b. The jig holds onto eyepiece 105 at input end 150. In one embodiment, either jig 405 or 410 is designed with attachment points that cover input end 150 and so as to seal it during the photo-chromic coating process thereby preventing the photo-chromic material from coating input end 150. By not coating input end 150 with photochromic material, the need for process control of the thickness and other secondary optical properties of the photo-chromic coating on input end 150 is obviated. In this way, the CGI light injected into eyepiece 105 is not subject to optical effects of the photo-chromic layer.

Process 300 illustrates two coating techniques that may be used to apply the photo-chromic coating to multiple sides of eyepiece 105 (decision block 315) after the internal components of eyepiece 105 have been assembled. One technique is dip coating (process block 320), as illustrated in FIG. 4A. As illustrated in FIG. 4A, a number of eyepieces 105 may be inserted into jig 405 and collectively dipped into a bath of photo-chromic material 415. Another technique is spray coating, as illustrated in FIG. 4B. With spray coating, eyepiece 105 is mounted into jig 410 and rotated (process block 325). While eyepiece 105 is rotated (or the spray nozzle is rotated around eyepiece 105), photo-chromic material 420 is coated onto the exposed surfaces of eyepiece 105 with sprayer 425. In either process shown in FIGS. 4a and 4b, the jig may house a single eyepiece or a plurality of eyepieces.

After coating eyepiece(s) 105 with a layer of photo-chromic material, eyepiece 105 is cured (process block 335). Curing may include bake curing, UV curing, drying in a clean and controlled environment, or otherwise. In some embodiments, in order to achieve a sufficiently thick coating of photo-chromatic material on eyepiece 105, multiple applications (dip or spray) and curing iterations may be used to successively build up a sufficiently thick coating of photo-chromatic material to achieve the desired level of UV darkening and ambient attenuation. Once all application and curing iterations are complete (decision block 340), eyepiece 105 is mated to electronics housing 110 and a display module for generating CGI light (process block 345). Alternatively, the photo-chromic application process may be applied after the eyepiece is mounted to the electronic housing.

FIG. 5 illustrates internal components of an eyepiece 500 along with a display module 501 for an HMD, in accordance with an embodiment of the disclosure. Eyepiece 500 is one possible implementation of the internal components of eyepiece 105 for use with HMD 100. The illustrated embodiment of eyepiece 500 includes an in-coupling polarizing beam splitter ("PBS") 505, an out-coupling PBS 510, a light relay section 515, a half-wave plate polarization rotator 520, a quarter-wave plate polarization rotator 525, and an end reflector 530. The illustrated embodiment of display module 501 includes an illumination source 535 and a display panel 540. The display panel 540 may comprise a liquid crystal on silicon (LCOS) panel. In alternative embodiments, the illumination source 535 and display panel 540 are combined into a single unit, and in such a case, the display panel may comprise a transmissive liquid crystal display.

In the illustrated embodiment, in-coupling PBS 505 and out-coupling PBS 510 are mounted within eyepiece 500 such that their partially reflective surfaces are oriented at oblique angles (e.g., 45 degrees) to forward propagation path 545. Forward propagation path 545 extends within eyepiece 500 from input end 550 to end reflector 530. Light relay section 515 is disposed between in-coupling PBS 505 and out-coupling PBS 510 to offset the two components. In-coupling PBS 505, out-coupling PBS 510, and light relay 515 may be fabricated of a transparent material such as glass, quartz, acrylic, clear plastic, PMMA, ZEONEX-E48R, etc. This permits ambient scene light 570 to pass through viewing region 560 to eye 102. The semi-transparent nature of viewing region 560 permits eyepiece 500 to provide an augmented reality to the user by augmenting ambient scene light 570 with CGI light.

Illumination source 535 may be implemented using a light emitting diode ("LED") source (or multi-color LED array), which illuminates display panel 540 through in-coupling PBS 505. Illumination source 535 may emit unpolarized light (e.g., both P and S linear polarization components) or emit polarized light (e.g., just P polarization component). Illumination source 535 and display panel 540 may be mounted to the outer side of in-coupling PBS 505 at the input end 550 in an opposing configuration on either side of eyepiece 500. Other configurations and orientations for illumination source 535 and display panel 540 may be implemented.

In-coupling PBS 505 is positioned at input end 550 between illumination source 535 and display panel 540. In-coupling PBS 505 may be implemented as a wire grid polarizer, a multi-layer thin film polarizer, or otherwise. In-coupling PBS 505 operates to substantially pass light of a first linear polarization while substantially reflecting light of a second polarization. The two linear polarizations are typically orthogonal linear polarizations. Display panel 540 (e.g., LCOS, LCD panel, etc.) imparts image data onto the illumination light output by illumination source 535 to generate the CGI light via selective reflection by an array of image pixels. Reflection by display panel 540 rotates the polarization of the incident lamp light by 90 degrees.

Upon reflection of the incident lamp light, the CGI light (which at each pixel of the display has been selectively rotated in polarization by 90 degrees in accordance with the image pattern) is re-directed by in-coupling PBS 540 (which reflects only the desired S polarization corresponding to the image) to half-wave plate polarization rotator 520. The CGI light passes through half-wave plate polarization rotator 520 becoming P polarized again, and propagates through light relay section 515 of eyepiece 500 along forward propagation path 545. In the embodiment shown, the CGI light is directed through section 515 of eyepiece 500 without need of total internal reflection ("TIR"). In other words, the cross sectional shape and divergence of the light cone formed by the CGI light is confined such that the light rays reach end reflector 530 without TIR off the sides of eyepiece 500. In other embodiments, TIR may be used.

In one embodiment, the length of light relay section 515 is selected such that the focal plane of end reflector 530 substantially coincides with an emission aperture of display panel 540. To achieve focal plane alignment with the emission aperture of display panel 540, both the length of light relay section 515 and the radius of curvature of end reflector 530 may be selected in connection with each other.

The illustrated embodiment of viewing region 560 includes a reflective surface formed by out-coupling PBS 510. In one embodiment, viewing region 560 is partially transparent, which permits external (ambient) scene light 570 to pass through the ambient scene side and through the eye-ward side of eyepiece 500 to reach eye 102. A partially transparent embodiment facilitates augmented reality ("AR") applications where the CGI light is superimposed over ambient scene light 570 to the user eye 102.

Out-coupling PBS 510 pass the CGI light travelling along forward propagation path 545 to end reflector 530. Out-coupling PBS 510 may be implemented as a wire grid polarizer, a multi-layer thin film polarizer, or otherwise. End reflector 530 reflects the CGI light back along reverse propagation path 580 again to out-coupling PBS 510. Between both forward and reverse propagation paths 545 and 580, the CGI light traverses quarter-wave plate polarization rotator 525 twice, causing the CGI light that reaches out-coupling PBS 510 on reverse propagation path 580 to be 90 degrees rotated and therefore once again S polarized. In one embodiment, end reflector 530, includes a convex lens shape that both reflects and collimates the CGI light such that the CGI light traveling along reverse propagation path 580 is substantially collimated. Substantially collimating the CGI light helps eye 102 to focus on the CGI light emitted out the eye-ward side in a near-to-eye configuration of an HMD. The CGI light is directed towards eye 102 due to the oblique orientation (e.g., approximately 45 degrees) of out-coupling PBS 510, which reflects the S polarized light out of viewing region 560 along an eye-ward direction. In other embodiments, one of in-coupling PBS 505 or out-coupling PBS 510 may be non-polarizing beam splitters (e.g., 50/50 beam splitters), in which case one or both of polarization rotators 520 and 525 may be omitted.

UV activated dimming of ambient scene light relative to the CGI light can be achieved by coating multiple side surfaces of eyepiece 500 with photo-chromic material in any of the manners discussed above. For example, the ambient scene side, eye-ward side, and top and bottom sides may be coated with or without coating input end 550. Furthermore, since end reflector 530 covers the distal end of eyepiece 500 this end is not susceptible to UV light and does not need a photo-chromic layer to block ambient light. As such, end reflector 530 (which may include a reflective layer covered by a protective rubberized layer) blocks the photo-chromic material from coming in contact with the CGI light reflecting from the forward propagation path 545 to the reverse propagation path 580 at the distal end.

The processes explained above may be described in terms of computer software and hardware. The techniques described may constitute machine-executable instructions embodied within a tangible or non-transitory machine (e.g., computer) readable storage medium, that when executed by a machine will cause the machine to perform the operations described. Additionally, the processes may be embodied within hardware, such as an application specific integrated circuit ("ASIC") or otherwise.

A tangible machine-readable storage medium includes any mechanism that provides (i.e., stores) information in a form accessible by a machine (e.g., a computer, network device, personal digital assistant, manufacturing tool, any device with a set of one or more processors, etc.). For example, a machine-readable storage medium includes recordable/non-recordable media (e.g., read only memory (ROM), random access memory (RAM), magnetic disk storage media, optical storage media, flash memory devices, etc.).

The above description of illustrated embodiments of the invention, including what is described in the Abstract, is not intended to be exhaustive or to limit the invention to the precise forms disclosed. In particular, although a monocular system has been described, the invention may be applied to a binocular system. While specific embodiments of, and examples for, the invention are described herein for illustrative purposes, various modifications are possible within the scope of the invention, as those skilled in the relevant art will recognize.

These modifications can be made to the invention in light of the above detailed description. The terms used in the following claims should not be construed to limit the invention to the specific embodiments disclosed in the specification. Rather, the scope of the invention is to be determined entirely by the following claims, which are to be construed in accordance with established doctrines of claim interpretation.

What is claimed is:

1. An eyepiece, comprising:
    a viewing region to emit display light out of the eyepiece along an eye-ward direction;
    an input end peripherally located from the viewing region, the input end configured to receive the display light into the eyepiece;
    one or more optical elements positioned to direct the display light received into the eyepiece out of the viewing region along the eye-ward direction;
    a first side through which ambient scene light is received into the eyepiece;
    a second side out of which the ambient scene light and the display light are passed along the eye-ward direction; and
    a photo-chromic coating disposed on the first side and the second side, the photo-chromic coating to darken in the presence of UV light.

2. The eyepiece of claim 1, wherein the first side comprises an ambient scene side and the second side comprises an eye-ward side.

3. The eyepiece of claim 2, wherein the eyepiece further includes:
    a top side; and
    a bottom side,
    wherein the photo-chromic coating is also disposed over the top side and the bottom side.

4. The eyepiece of claim 3, wherein the eyepiece has a rectangular cuboid shape.

5. The eyepiece of claim 3, wherein the photo-chromic coating is absent from the input end where a display module couples to the eyepiece.

6. The eyepiece of claim 5, wherein the photo-chromic coating is dip coated or spray coated onto the eyepiece such that the entire top side, bottom side, ambient scene side, and eye-ward side of the eyepiece, except for the input end, are coated with the photo-chromic coating.

7. The eyepiece of claim 3, wherein the photo-chromic coating is dip coated or spray coated onto the eyepiece such that the entire top side, bottom side, ambient scene side, and eye-ward side of the eyepiece, including the input end, are coated with the photo-chromic coating.

8. The eyepiece of claim 3, wherein the eyepiece further comprises:
a distal end opposite the input end;
a concave mirror disposed over the distal end to reflect the display light propagating along a forward optical path within the eyepiece to a reverse optical path within the eyepiece; and
a protective material disposed over the concave mirror to protect the concave mirror,
wherein the concave mirror and the protective material prevent the photo-chromic coating from affecting the forward or reverse optical paths at the distal end.

9. The eyepiece of claim 3, wherein the eyepieces comprises plastic and wherein the ambient scene side, the eye-ward side, the top side, and the bottom side are coated with the photo-chromic coating to inhibit degradation of the plastic due to ultraviolet ("UV") radiation.

10. The eyepiece of claim 1, wherein the one or more optical elements includes:
an input reflective surface disposed within the eyepiece and positioned at the input end to redirect the display light down within the eyepiece towards the viewing region; and
output reflective surface disposed within the eyepiece and positioned at the viewing region to redirect the display light out of the eyepiece along the eye-ward direction.

11. The eyepiece of claim 10, wherein the input and output reflective surfaces are polarizing beam splitters.

12. The eyepiece of claim 10, wherein the output reflective surface is partially reflective beam splitter.

13. A method of fabricating an eyepiece, the method comprising:
forming a viewing region of the eyepiece to emit display light out of the eyepiece along an eye-ward direction, the viewing region including an ambient scene side through which ambient scene light is received into the eyepiece and an eye-ward side out of which the ambient scene light and display light are passed along the eye-ward direction;
forming an input end of the eyepiece, the input end peripherally located from the viewing region, the input end for receiving the display light from a display module into the eyepiece; and
coating the ambient scene side and the eye-ward side of the eyepiece with a photo-chromic layer that darkens in the presence of UV light.

14. The method of claim 13, wherein the eyepiece further includes a top side and bottom side, the method further comprising:
coating the top side and the bottom side of the eyepiece with the photo-chromic layer.

15. The method of claim 14, wherein the eyepiece has a rectangular cuboid shape.

16. The method of claim 15, wherein coating the ambient scene side, the eye-ward side, the top side, and the bottom side of the eyepiece comprises dip coating the eyepiece into photo-chromic material so as not to coat the input end of the eyepiece.

17. The method of claim 16, wherein dip coating the eyepiece into the photo-chromic material comprises dipping the eyepiece into the photo-chromic material multiple times and curing the eyepiece between each dip iteration.

18. The method of claim 14, wherein the photo-chromic coating is absent from the input end.

19. The method of claim 18, wherein coating the ambient scene side, the eye-ward side, the top side, and the bottom side of the eyepiece comprises spray coating the eyepiece with photo-chromic material without spraying the input end of the eyepiece with the photo-chromic material.

20. The method of claim 19, wherein spray coating the eyepiece with the photo-chromic material comprises spraying the eyepiece with the photo-chromic material multiple times and curing the eyepiece between each spray iteration.

21. The method of claim 14, the method further comprising:
forming a concave mirror disposed over a distal end opposite the input end to reflect the display light propagating along a forward optical path within the eyepiece to a reverse optical path within the eyepiece; and
forming a protective material disposed over the concave mirror to protect the concave mirror,
wherein the concave mirror and the protective material prevent the photo-chromic layer from coating a surface of the distal end through which the forward or reverse optical paths pass.

22. The method of claim 13, further comprising:
inserting the eyepiece into a housing including the display module,
wherein coating the ambient scene side and the eye-ward side of the eyepiece with the photo-chromic layer comprises coating the ambient scene side and the eye-ward side of the eyepiece with the photo-chromic layer after inserting the eyepiece into the housing.

23. An optical apparatus, comprising:
a viewing region to emit display light out of the optical apparatus along an eye-ward direction;
an input end peripherally located from the viewing region, the input end configured to receive the display light into the optical apparatus;
one or more elements internally disposed to direct the display light received into the optical apparatus out of the viewing region along the eye-ward direction;
a first side through which ambient scene light is received into the optical apparatus;
a second side out of which the ambient scene light and the display light are passed along the eye-ward direction; and
a photo-chromic coating disposed on the first side and the second side, the photo-chromic coating to darken in the presence of UV light.

24. The optical apparatus of claim 23, further comprising:
a top side; and
a bottom side,
wherein the photo-chromic coating is also disposed over the top side and the bottom side.

* * * * *